US005523746A

United States Patent [19]

Gallagher

[11] Patent Number: 5,523,746

[45] Date of Patent: Jun. 4, 1996

[54] IDENTIFICATION SYSTEM WITH A PASSIVE ACTIVATOR

[76] Inventor: Robert R. Gallagher, 221 Gladys Ave. #10, Mountain View, Calif. 94043

[21] Appl. No.: 299,940

[22] Filed: Sep. 1, 1994

[51] Int. Cl.[6] .......... H04Q 1/00

[52] U.S. Cl. .......... 340/825.31; 340/825.34; 340/825.54

[58] Field of Search .......... 340/825.54, 825.31, 340/825.34, 572, 825.72, 825.44; 607/32

[56] References Cited

U.S. PATENT DOCUMENTS

| | | | |
|---|---|---|---|
| 3,689,885 | 9/1972 | Kaplan et al. . | |
| 3,979,647 | 9/1976 | Perron et al. . | |
| 4,333,072 | 1/1982 | Beigel | 340/825.54 |
| 4,354,189 | 10/1982 | Lemelson | 340/325.31 |
| 4,361,153 | 11/1982 | Slocum et al. | 607/32 |
| 4,453,161 | 6/1984 | Lemelson . | |
| 4,517,563 | 5/1985 | Diamant | 340/825.54 |
| 4,600,829 | 6/1986 | Walton | 340/825.34 X |
| 4,724,427 | 2/1988 | Carroll | 340/572 |
| 4,779,090 | 10/1988 | Micznik et al. . | |
| 4,779,091 | 10/1988 | Oyagi et al. . | |
| 4,857,913 | 8/1989 | Lewiner et al. . | |
| 4,868,915 | 9/1989 | Anderson, III et al. . | |
| 4,931,789 | 6/1990 | Pinnow . | |
| 4,942,393 | 7/1990 | Waraksa et al. . | |
| 5,095,309 | 3/1992 | Troyk et al. | 340/825.54 |
| 5,105,190 | 4/1992 | Kip et al. . | |
| 5,109,221 | 4/1992 | Lambropolos et al. . | |
| 5,111,199 | 5/1992 | Tomoda et al. . | |
| 5,113,184 | 5/1992 | Katayama . | |
| 5,159,713 | 10/1992 | Gaskill et al. | 340/825.44 |

*Primary Examiner*—Donald J. Yusko
*Assistant Examiner*—Edwin C. Holloway, III
*Attorney, Agent, or Firm*—Townsend and Townsend and Crew

[57] ABSTRACT

An identification system that employs a passive activator 320 to transmit an identification code. From a low frequency electromagnetic field, the passive activator derives AC voltage and converts it to DC pulses. The DC pulses energizes the activator in order to transmit the identification code within one of the DC pulses. A controller 100, upon receiving an authorized code, generates an output for activating a device.

29 Claims, 8 Drawing Sheets

IDENTIFICATION SYSTEM WITH A PASSIVE ACTIVATOR

BACKGROUND OF THE INVENTION

The present invention relates to an identification system which employs an activator that transmits an identification code which is processed by a controller. The controller may be designed to perform specific functions when a valid identification code has been received. In particular, the identification system is adapted for use in an electronic key system.

Various systems have been developed to replace the use of mechanical keys in order to provide convenience and increase security. One type of electronic key system utilizes an electronic combination pad. Typically, the electronic combination pad consists of a panel of approximately five buttons located in the vicinity of a door knob. The user must depress the buttons in a predefined sequence to disengage the lock. This type of keyless system prove less than desirable because the combination can be forgotten. Furthermore, an unauthorized person can easily obtain the combination by merely observing the user depressing the appropriate code.

Other systems comprise a battery powered electronic device such as an activator. The activator, designed to operate at radio frequencies, sends a preprogrammed code to a control module. Upon verification of an authorized code, the module disengages the lock. These systems have apparent disadvantages. For example, interference from radio communication devices or electrical storms may cause the system to malfunction. In addition, the use of a battery as a portable power source limits the miniaturization of the activators, even when employing current fabrication techniques. It also renders the activator to be bulky and inconvenient to carry around. Moreover, the battery source must be periodically replaced, further inconveniencing the user.

Some systems, such as those disclosed in U.S. Pat. No. 4,453,161, have proposed the use of "a short wave energy field" as a technique for generating a source of power in the activator. Electromagnetic induction, as disclosed in U.S. Pat. No. 4,857,913, has also been proposed as a substitute for using a battery as a power source. However, all of these systems require capacitors associated with the conversion of alternating current (AC) from electromagnetic fields or high frequency energy fields into direct current (DC), which is mandatory to operate the electronic devices. The capacitors, when compared to the other components, are relatively large. As such, the size of the activators may be limited by the size of the capacitors.

From the above, it is apparent that there is a need to provide a passive activator without requiring the use of either a portable power source or capacitors to convert AC to DC. In this manner, the activator could be miniaturized to a size which is amenable to being encased in, for example, a finger ring band. The ring band would be difficult to lose and very convenient to use. The user need not remember difficult combinations nor is there a potential threat of it being stolen by an unnoticed observer.

SUMMARY OF INVENTION

The present invention provides an identification apparatus for encoding and decoding a code. The identification system includes a controller having an electromagnet for generating an electromagnetic field which induces a secondary voltage in a passive activator. The passive activator comprises a secondary coil for producing an alternating current voltage therein when placed in the electromagnetic field. A rectifier is connected to the secondary coil and converts the alternating current voltage to a plurality of direct current pulses. In some embodiments, the rectifier may be a Zener diode to limit the direct current pulses to a predetermined voltage level to prevent damaging electronic components in the passive activator. The current pulses power a logic circuit which generates and modulates a code on a carrier wave. The controller receives and decodes the signal to obtain the code. The controller generates a signal when the code matches an authorization code. In one embodiment, the signal is used to engage or disengage an electronic lock.

A further understanding of the nature and advantages of the inventions herein may be realized by reference to the remaining portions of the specification and the attached drawings.

DESCRIPTION OF THE PREFERRED EMBODIMENT

CONTENTS

I. General
II. Details of One Embodiment of Invention
III. Details of Alternative Embodiments of the Invention
a. Multi-Input Controller
b. Direct Current Controller
c. Continuous Transmission
d. Increased Capacity
e. Provisioning of both Positive and Negative Voltage
f. Key Code Encryption

I. General

The present invention provides an identification system which utilizes an activator for sending an identification code or "key code". In particular, the activator of the present invention is a passive device. In other words, the activator does not contain any power source such as a battery. Instead, the activator derives power from voltage induced in its coil. Further, the activator does not require the use of relatively bulky capacitors associated with conversion of AC to DC. As a result, the size of the activator is significantly miniaturized, thus enabling the activator to be used in smaller places and become more portable and convenient.

The invention will have a wide range of uses such as operating security systems, activating implanted medical devices, or other applications requiring small devices.

II. Details of One Embodiment of Invention

Figure 1A:
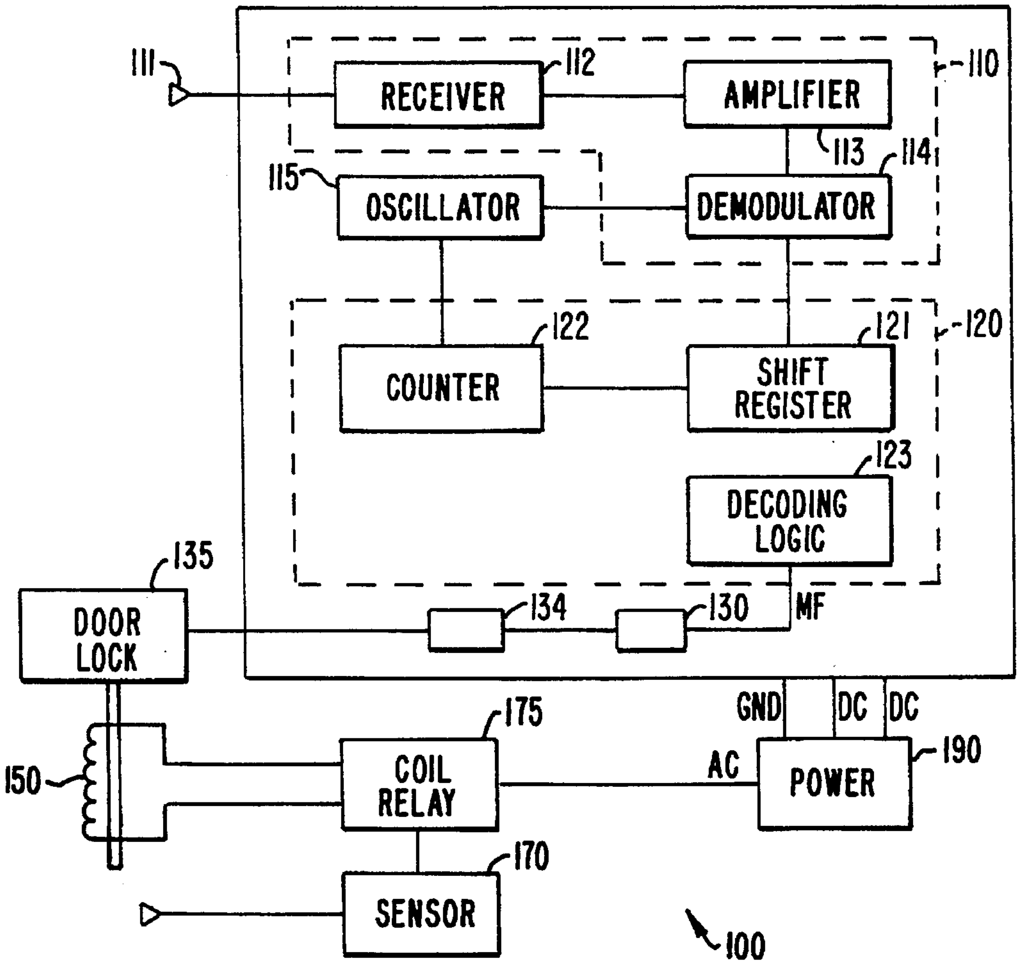
FIG. 1*a* illustrates a controller according to one embodiment of the invention.

FIG. 1*a* illustrates a controller 100 according to one embodiment of the present invention. The controller includes a power source 190. In one embodiment, the power source supplies DC power (positive and negative) continuously to operate the controller. Optionally, a switch (not shown) may be employed to interrupt the DC power to turn the controller off and on. The power source also supplies AC power, such as 110 volts AC (VAC) at 60 Hz (normal municipal power), to a primary electromagnet 150 for creating an electromagnetic field between the poles of the magnet. Although certain necessary power and ground connections may have been omitted in the figures herein, it will be obvious to those skilled in the art that these connections exist.

The purpose of the primary electromagnetic field is to induce a voltage in a secondary coil of an activator. The core of the electromagnet may be in the shape of a U, C, or other configuration so as to increase the electromagnetic flux and allow the activator to be easily located in the most dense portion of the electromagnetic field. In some applications, it may be desirable to increase the induced voltage level in the secondary coil of the activator. This may be achieved by stepping up the frequency of the ac current to intensify the magnetic field. For instance, the 60 Hz AC current may be stepped up to 1000 Hz, increasing the voltage proportionally.

A sensor 170 is connected to a relay 175. The sensor may be any conventional proximity sensor, such as a magnetic, capacitive, inductive, or acoustic sensor, which undergoes a change in electronic status in response to the presence of an object in its field. When the relay is activated, it switches on the electromagnet by flowing AC current thereto. The sensor may be configured to activate the relay when it senses an object near the electromagnet. In this manner, a primary electromagnetic field is created only when an object such as an activator 320 is located at or near the electromagnet.

When activator 320 is properly located in the primary electromagnetic field, a secondary AC voltage is induced therein. The AC power is converted to DC power, switching on the activator for generating and transmitting a binary key code on a carrier wave. The activator will be described in detail in connection with FIG. 4.

A signal processor 110 in the controller receives and processes the signal to obtain the key code. The signal processor may include an antenna 111 connected to a receiver 112, an amplifier 113, and a demodulator 114. The receiver can be any known receiver such as a crystal receiver, capacitor and coil tuned receiver, or other available receiver, which collects the signal via the antenna. Generally, the antenna may be located near the electromagnet to ensure good signal reception (i.e., locating the antenna close to the activator). Amplifier 113 boosts the signal to an acceptable voltage level. Demodulator 114 receives the amplified signal and decodes the key code therefrom. The demodulator will vary according to the modulation technique employed by the activator. It will be understood that any known modulation or demodulation technique, including those disclosed in Bernard Sklar, *Digital Communications Fundamentals and Applications*, Prentice Hall, 1988, incorporated herein by reference for all purposes, may be used.

In one embodiment, the activator employs a simple modulation scheme using a shift register and a counter. The key code is loaded into the shift register and shifted out serially at a rate determined by the counter. As each bit is shifted out, it is modulated and transmitted on a carrier wave. In the controller, the demodulator separates the key code from the carrier wave by sampling the signal at a rate that is equal to the rate at which the shift register in the activator shifts the key code. The sampling rate may be derived from an oscillator 115, which in one embodiment is a crystal oscillator having the same frequency as the carrier wave. This allows the demodulator to decouple the carrier wave from the key code.

The demodulator passes the key code serially to a processor 120 to ascertain whether it is an authorized key code. The processor may include a shift register 121, a counter 122, and a decoding logic 123. The shift register may be a serial in parallel out shift register of the type that is well known to those skilled in the art. The operation of the shift register may be controlled by counter 122 and oscillator 115. The counter, which may be any divide by counter known in the art, reduces the frequency of the oscillator to match the modulation scheme (i.e., the rate at which each bit of the key code is encoded onto the carrier wave). As a result, the shift register stores the key code, thus allowing the decoder to sample and process the sequence of bits comprising the key code in parallel.

In some embodiments, the decoding logic may be preset with an authorized key code at the factory. Such controllers generally contain a single authorization code which cannot be altered by the user. The decoder may comprise several AND GATES and NOR GATES (not shown). Alternatively, programmable array logic (PALs) or other programmable logic devices may be employed to allow preprogramming of more than one authorization code at the factory.

If the key code matches an authorization code, then the decoding circuit generates a signal MF (match found) for activating a multivibrator (one shot) 130. The output from the multivibrator switches on an output relay 134, which may be used to control an electric door lock 135 or other device.

Figure 1B:
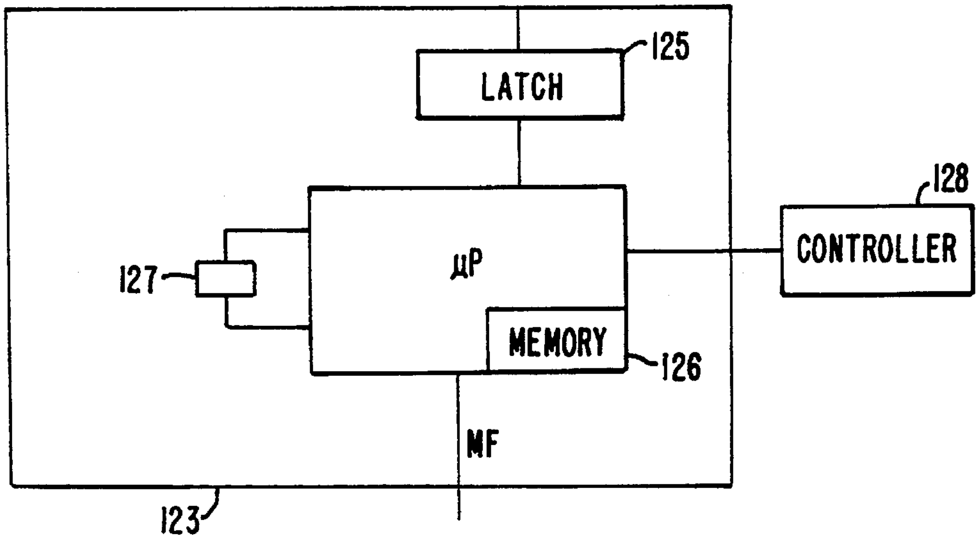
FIG. 1*b* illustrates a microprocessor based controller.
Figure 4:
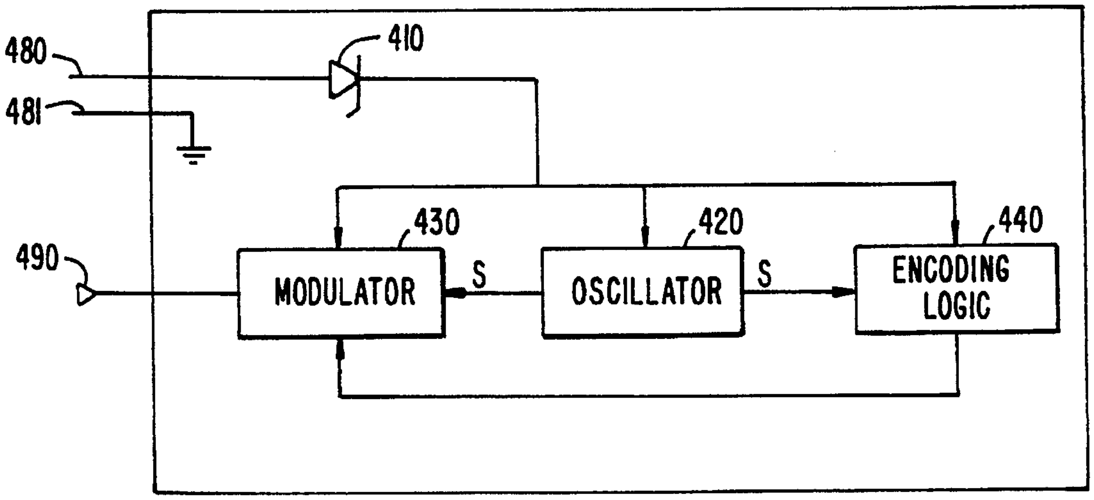
FIG. 4 illustrates an activator of FIG. 3 in detail.

FIG. 1*b* illustrates an alternative embodiment of the decoding logic. As shown, decoding logic 123 comprises a microprocessor 126. The microprocessor, for example, may be of the type that is well known to those skilled in the art such as an Intel 80386. By employing a microprocessor, the system may be programmed according to the user's needs. The microprocessor includes memory, such as a read only memory (ROM), for storing the instructions or program(s) used by the microprocessor, authorization codes, and other data. Although the ROM is depicted as part of the microprocessor unit, those skilled in the art will appreciate that the ROM is usually a separate component. Other memory, such as an erasable programmable read only memory (EPROM), random access memory (RAM), non-volatile random access memory (NVRAM), flash memory manufactured by Intel Corporation, or other memory device, may be employed in addition to or instead of the ROM. According to one embodiment, the authorization codes are stored in the flash memory or NVRAM so as to prevent the codes from being erased in event of a power outage. An oscillator 127 controls the frequency (or speed) at which the microprocessor operates. When using a microprocessor, there is no need to match the activator's data transmission or carrier frequency. Therefore, it is advantageous to operate the microprocessor as fast as possible so as to execute as many instructions within one DC pulse. This feature will become apparent in the discussion pertaining to the activator (FIG. 4).

In some instances, it may be desirable to store a special key code in an unalterable ROM at the factory to avoid having the system destroyed if the activator is inadvertently lost or stolen. The special code, for example, can be kept secret and maintained only by the manufacturer. The manufacturer can, upon request from the user, reprogram the system with a different authorization code from a replacement activator, thus rendering the lost or stolen activator useless.

An input buffer 125 receives the code, in parallel, from the shift register (FIG. 1*a*). The input buffer may be a latch of the type well known in the art. The microprocessor reads the code from the latch and processes it according to a program stored in its memory. For example, if the transmitted code matches an authorization code, the microprocessor generates a signal MF for activating an electronic locking device.

The microprocessor affords flexibility to the system. In one embodiment, the system may be programmed to accept a multiplicity of authorization codes. Each authorization code may be associated with a different priority level. A user having the highest priority may have unlimited access to a secured area while a user with a lower priority may have only limited access to such area.

Figure 1C:
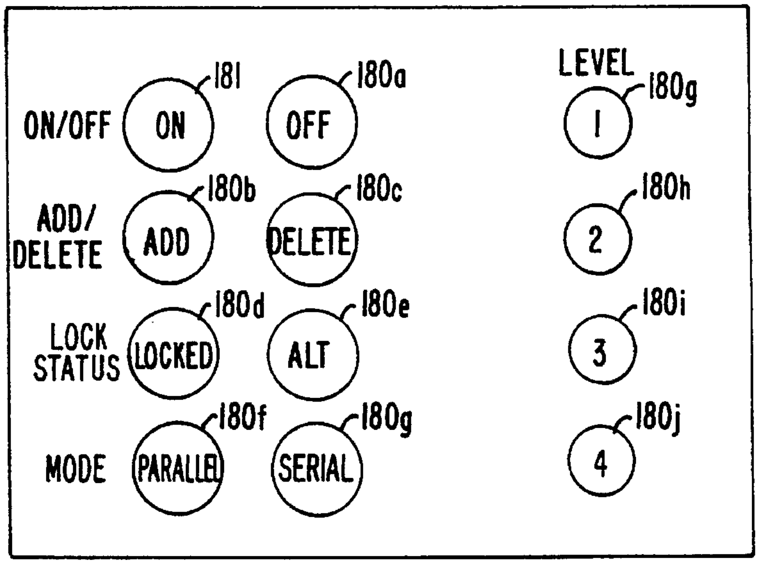
FIG. 1*c* illustrates a control panel for operating the microprocessor.

The microprocessor may be programmed via a control panel 128. FIG. 1*c* illustrates control panel 128 in detail. The control panel may comprise a plurality of control switches 180*a*–180*j* and serves as an user interface. To ensure security, an activator may be required to transmit a valid key code before accessing the control panel. This feature requires the control panel to have an electromagnet for generating an electromagnetic signal. Additionally, electronics similar to those used by the controller are provided to receive and process the key code. Of course, the control panel can be configured to utilize the existing electronics in the controller.

Once the control panel is accessed, a user may turn the system on and off by activating switch 180*a*. Additionally, the user may be required to have a certain priority level (i.e., highest level) before the system may be disengaged for security reasons. A light 181 may be employed to indicate when the system is disengaged. Switches 180*b* and 180*c* control the addition and deletion of authorization codes from memory. An authorization code may be added by depressing switch 180*b*, placing an unauthorized activator in the control panel's electromagnetic field, and transmitting the associated key code. The control panel then prompts the user to enter the priority level associated with the new authorization code via switches 180*g*–180*i*. The new authorization code and the associated priority level are then stored in memory. Similarly, an authorization code may be deleted by pressing switch 180*c* and placing the activator of interest in the control panel's electromagnetic field. The system then deletes the key code transmitted by the activator from its memory. The system may include safeguards to prevent users having a lower priority level from adding or deleting authorization codes with higher priority. Switches 180*d* and 180*e* determine the mode in which the lock operates. For example, activating switch 180*d* causes the lock to remain engaged after the user has accessed the secured area. On the other hand, activating switch 180*e* causes the lock to alternate between the lock and unlock state. Switches 180*f* and 180*g* program the system to operate either in parallel or in serial with an mechanical key. Other switches may be provided to increase the functionality of the system. Alternatively, the control panel may comprise a keyboard or other data input device to operate the microprocessor.

Figure 2:
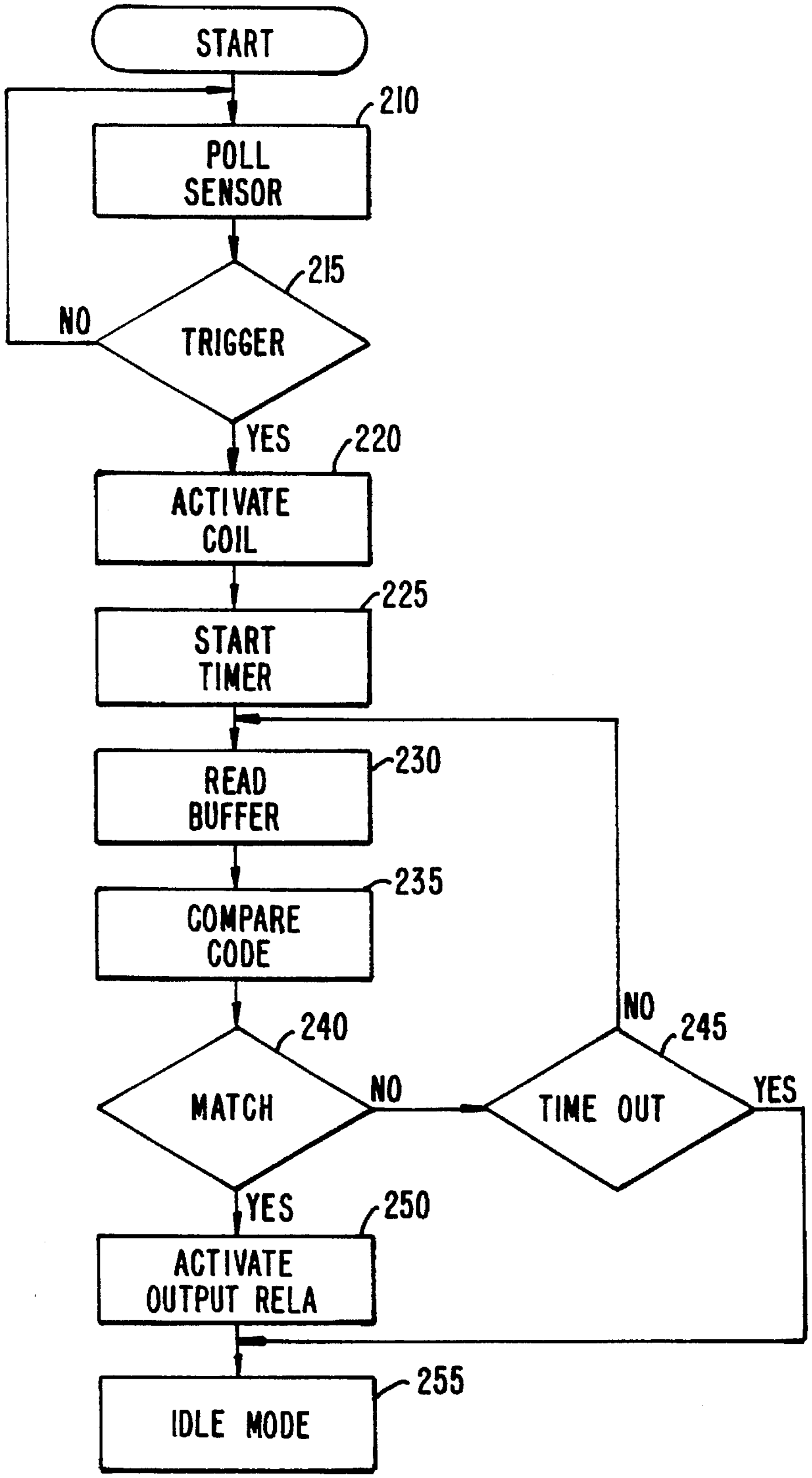
FIG. 2 is a flow chart illustrating the controller in operation.

FIG. 2 is a flow chart illustrating the operation of the controller according to one embodiment of the present invention. Normally, to conserve energy, the system operates in the "idle mode" wherein only the necessary components are switched on. At step 210, the controller polls the sensor and determines if any objects are in its field at step 215. At step 220, if the system receives an affirmative signal from the sensor, the system switches on the coil relay. Otherwise, the system continues polling the sensor at step 210. When the coil relay is switched on, an electromagnetic field is created. This electromagnetic field induces a secondary voltage in the activator, thus enabling it to send the key code. At step 225, the system initiates a timer, which in some embodiments, is set at about 1 second. This prevents the system from remaining on when an invalid key code is transmitted. At step 230, the system reads the input buffer which stores the code that was transmitted by the activator. At step 235, the controller compares the code with the authorization codes that are stored in memory and determines if there is a match at step 240. If a match is found, the controller, at step 250, activates the output relay. At step 255, the system returns to the idle mode. If no match is found, the system proceeds to step 245 where the controller checks to see if a timeout signal has occurred. A timeout signal causes the controller to return to the idle mode at step 255. Otherwise, the system repeats the loop commencing at step 230.

Figure 3:
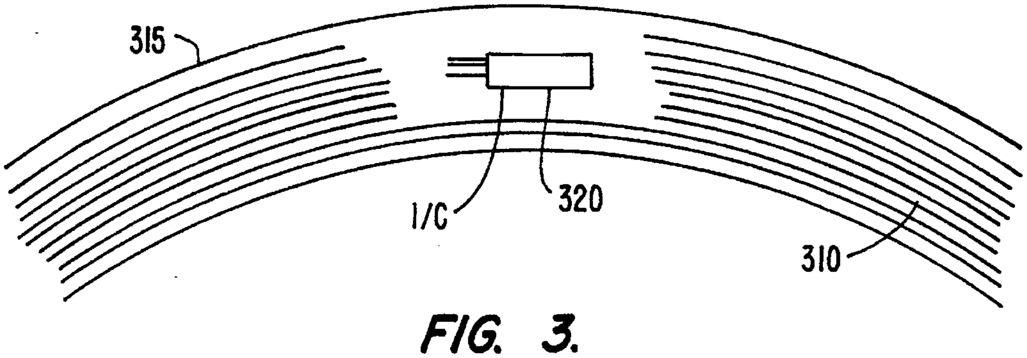
FIG. 3 illustrates an activator.

FIG. 3 illustrates an activator. According to one embodiment, the activator is a custom integrated circuit being of a size small enough to be encased in the band of a finger ring. Although a finger ring is emphasized, those skilled in the art will appreciate that any convenient object, such as a watch, bracelet band, or other device, may be employed. In fact, the miniaturization of the activator creates virtually limitless possibilities. A secondary coil 310 is placed inside the ring band 315. The ring band provides a natural support for the coil, which, for example, may comprise about 200 turns of #38 wire. The ends of the coil are connected to activator 320. When appropriately positioned in the primary electromagnetic field, the coil generates AC voltage to operate the activator.

FIG. 4 is a schematic block diagram of one embodiment of the activator. As shown, coil ends 480 and 481 are connected to a diode 410 and ground respectively. The diode, which may be a Zener diode, converts the alternating current (AC) into direct current (DC) pulses. The DC pulses provide power for operating the electronics in the activator. Accordingly, the activator switches on and off in accordance with the DC pulses. The Zener diode also limits the DC pulses to a predetermined maximum voltage level (e.g., 6 volts) to avoid damaging the components in the activator.

Figure 5A:
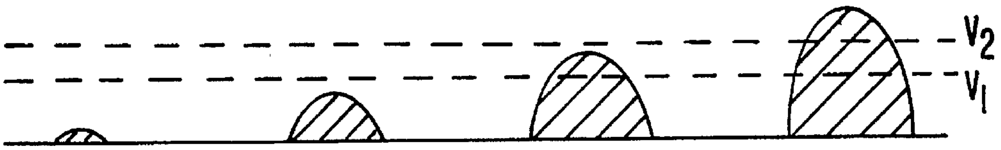
FIG. 5*a* illustrates a plot of the DC pulses versus time as generated by the activator of FIG. 4.

FIG. 5*a* illustrates a plot of the DC pulses generated by the rectifier versus time. According to one embodiment, the pulses occur about 60 times per second due to the 60 Hz primary voltage source. Of course, the number of pulses per second will vary according to the frequency of the primary voltage source. For example, if the primary voltage source is 1000 Hz, than the pulses occur about 1000 times per second. As the secondary coil approaches alignment in the electromagnetic field, the induced voltage therein increases. V1 represents the activator's minimum operating voltage and V2 represents the maximum voltage allowed by the Zener diode. Thus, the activator is turned on when the level of the pulse eclipses V1 and is turned off when the level of the pulse drops below V1. In one embodiment, the activator transmits the code at least once within one pulse.

Figure 5B:
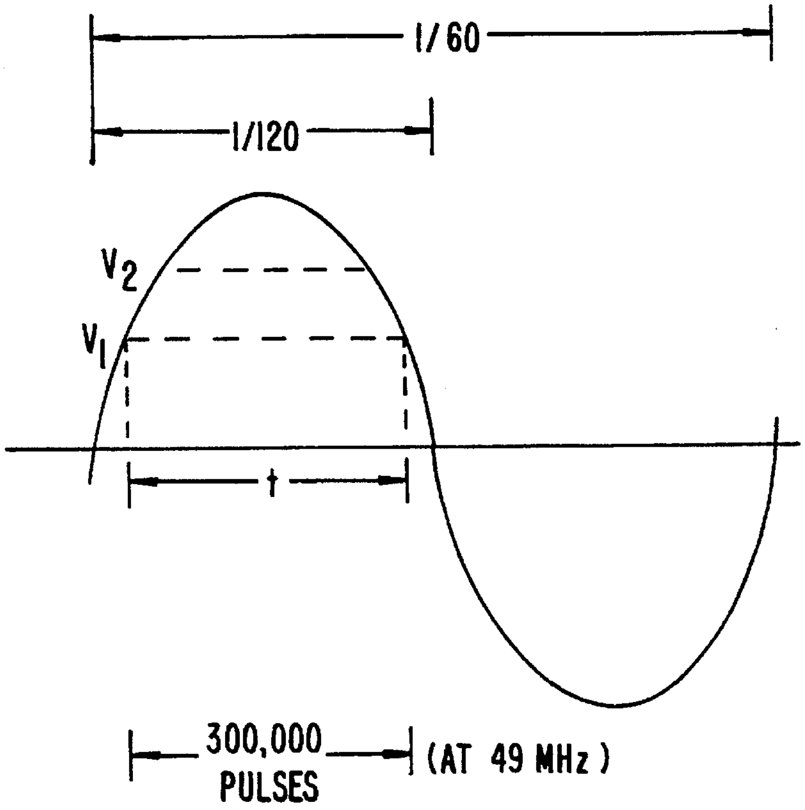
FIG. 5*b* illustrates the activator's operating range.

FIG. 5b shows an interval t during which the resulting voltage is within proper operating range for the activator. Using a 60 Hz primary voltage, the width of each DC pulse is about 1/120th second. The interval t will be slightly less than the pulse's width or approximately 1/150th of a second, at the maximum, depending on the slope of the pulse curve. By employing a high frequency oscillator many thousands of clock pulses may fit into one DC pulse. If the frequency of the primary voltage is increased to 1000 Hz, then the DC pulse width decreases to about 1/2000th second. In such instances, the activator may require a higher frequency oscillator to compensate for the decreased DC pulse width.

Referring back to FIG. 4, the output of diode 410 is used to operate an oscillator 420, an encoding logic 440, and modulator 430. The oscillator generates high frequency clock pulses S for regulating the operating speed of the encoding logic Preferably, the oscillator generates a sufficient number of pulses to allow the encoding logic to transmit the key code within one DC pulse. In one embodiment, the oscillator is a 49 MHz crystal oscillator, which generates approximately 300,000 clock pulses for each DC pulse (60 Hz primary voltage). As such, the activator operates for about 300,000 cycles before turning off, which is more than adequate to transmit the code to the receiver.

The encoding logic generates a key code which is encoded onto a carrier wave by the modulator. In some embodiments, the encoding logic includes a counter or counters and a shift register (not shown) such as those that are well known in the art. Each bit of the shift register is linked to data lines which are connected to a logic 1 (i.e., 5 volts). These data lines determine the key code and are preset at the factory. A laser may be employed to break certain data input connections, thus converting the input from a logic 1 to a logic 0 (i.e., 0 volts). In this manner, the bits comprising the key code are defined.

In operation, the key code is loaded into the shift register. A first counter may be utilized to control the parallel loading of the key code into shift register while a second counter dictates the rate at which each bit of the key code is shifted to the modulator. The counter(s) and shift register are configured so that all the key code bits are shifted to the modulator before parallel loading recurs.

As the encoding logic passes each bit of the key code to the modulator 245, it is encoded and transmitted on a carrier frequency via an antenna 490. The antenna, for example, may also be in the form of a coil within the finger ring band. Various modulation techniques may be employed for transmitting the key code. For example, such techniques include Frequency Shift Key (FSK) or others such as those disclosed Bernard Sklar, *Digital Communications Fundamentals and Applications*, Prentice Hall, 1988, already incorporated herein by reference for all purposes. According to one embodiment, the modulator comprises an AND GATE which combines the oscillator's output S and the signal D (representing the key code) from the encoding logic. Accordingly, the modulator relies on signal S to generate the carrier wave for transmitting the key code. The activator transmits the key code continuously until the voltage drops below the minimum operating voltage (Vl).

III. Details of Alternative Embodiments of the a. Multi-Input Controller

Figure 6:
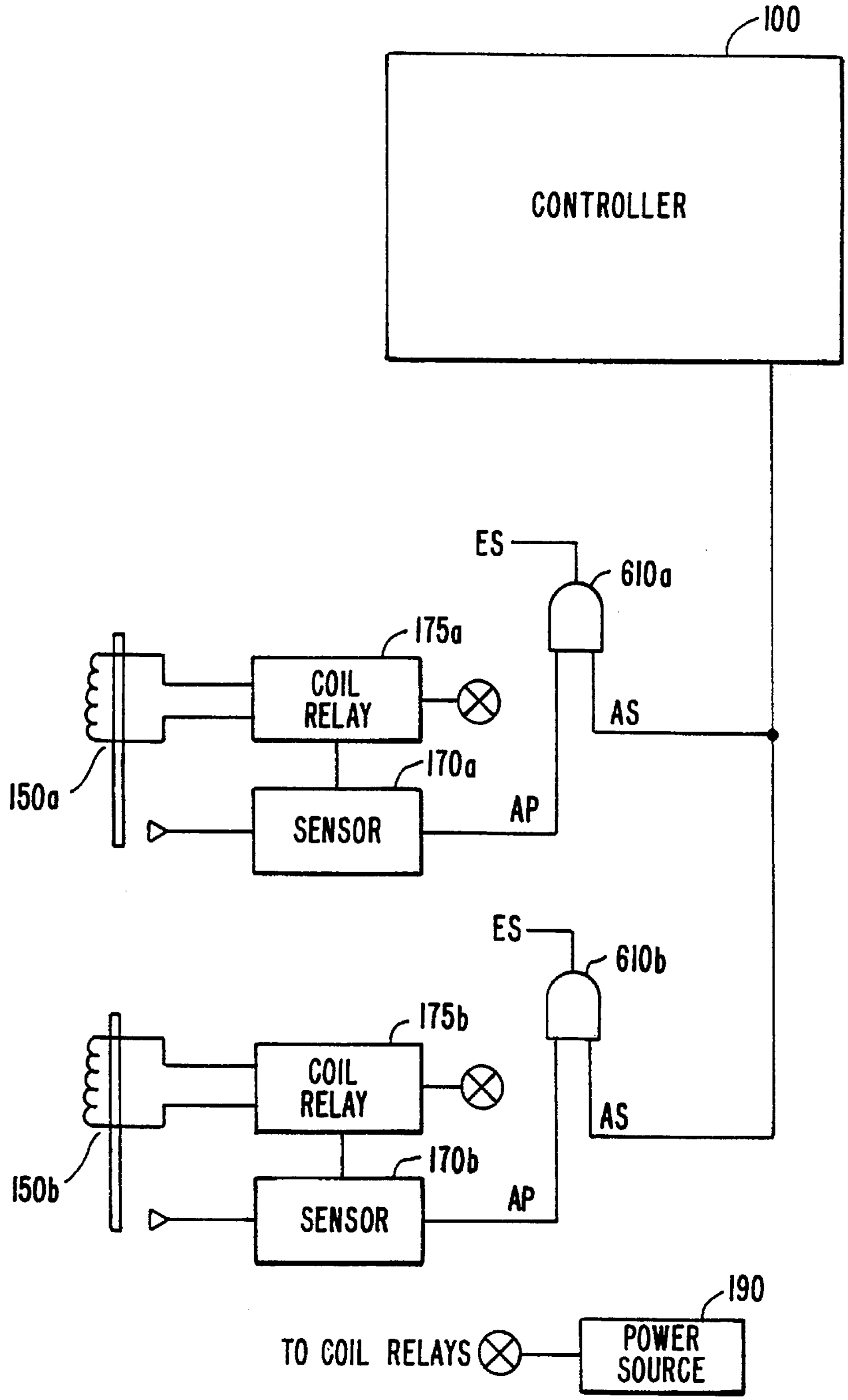
FIG. 6 illustrates a controller having multi-inputs.

FIG. 6 illustrates controller 100 adapted to provide additional inputs and outputs for controlling a plurality of devices. As shown, the controller includes primary electromagnets 150*a* and 150*b*, coil relays 175*a* and 175*b*, sensors 170*a* and 170*b*, and AND GATES 610*a* and 610*b*. The electromagnets, coil relays and sensors are similar to those disclosed in FIG. 1*a*. Each primary electromagnet is associated with a coil relay, a sensor, and an AND GATE (as indicated by either a or b after the reference numbers) and are configured in a similar manner. According to one embodiment, electromagnet 150*a* may be set to operate the front door while electromagnet 150*b* may be set to operate the back door. Additional electromagnets and associated components may be used to regulate, for example, an alarm system, or other security system.

The sensor switches on the coil relay when it detects an object in its field, thus allowing AC current from a power source 190 to flow through the primary electromagnet so as to create an electromagnetic field. Simultaneously, the sensors generate an AP (activate power) signal. As previously described, the activator transmits a signal containing a key code when properly located in the primary electromagnetic field. An antenna (not shown), which is connected to a receiver in the controller, may be situated in close proximity to each electromagnet to improve signal reception. The controller receives the key code, and, if it matches an authorization code, generates an AS (activate switch) signal. Signals AS and AP are fed through the AND GATES. The AND GATE at which both signals are present produces a signal ES (enable switch) to engage/disengage the appropriate electronic lock device. Alternatively, decoders, multiplexers, or PALs may be employed for such purposes.

b. Direct Current Controller

Figure 7:
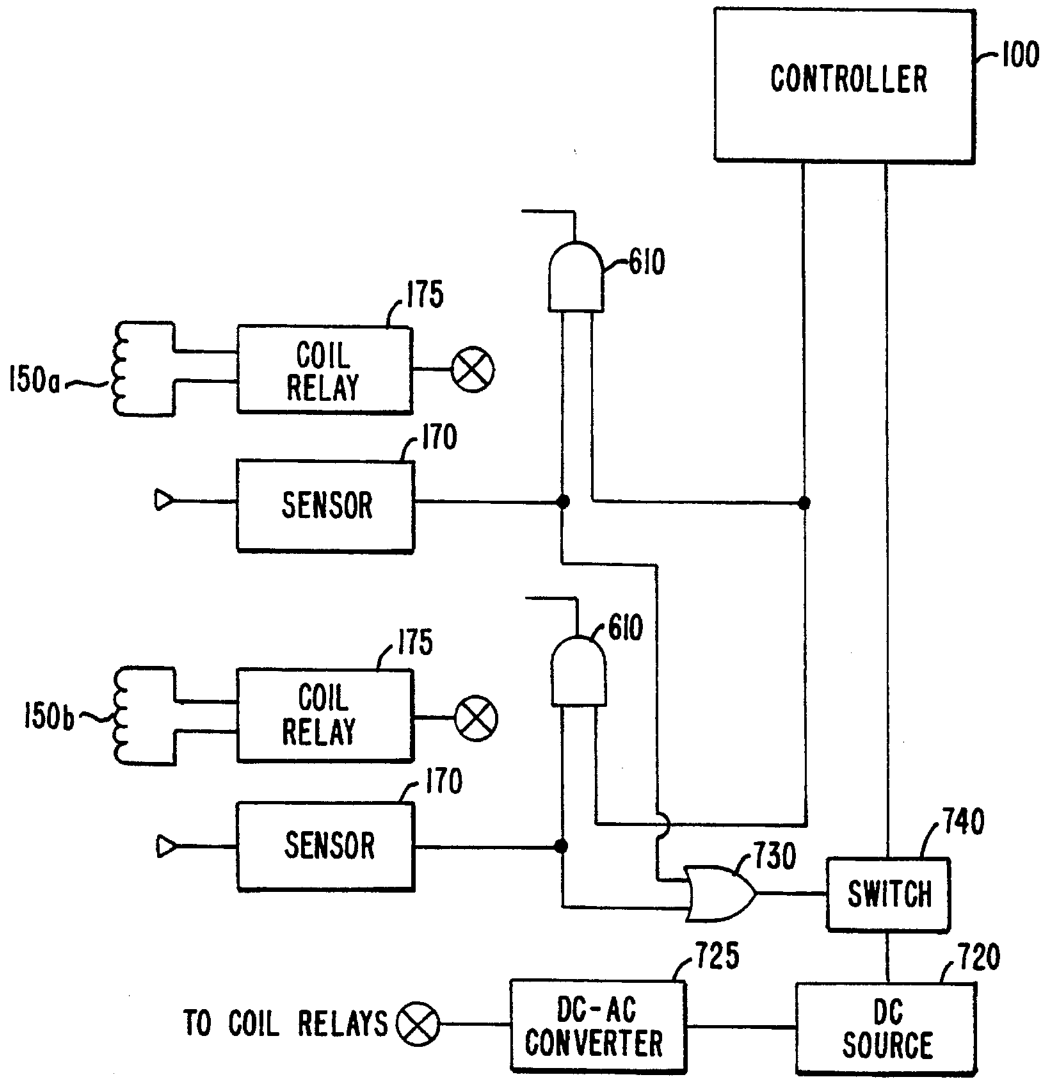
FIG. 7 illustrates a controller which is powered by a DC power source.

FIG. 7 illustrates a controller 100 which employs a DC power source. Such controller, for example, may be adapted for use in a motor vehicle or other application where an AC power source is unavailable. As shown, the controller is provided with a DC power source 720. In some embodiments, the source may be a 12 volt battery which is commonly used in vehicles. A DC-AC converter 725 converts the DC voltage to, for example, 110 VAC at 60 Hz. A step down transformer (not shown) of the type that is well known to those skilled in the art may be used to decrease the voltage from the DC power source to the appropriate levels in order to operate the controller. Alternatively, a power source of the type described in FIG. 1*a* may be employed using AC power provided by the DC-AC converter which is connected to the DC power source.

The controller 100 has the capacity to receive multiple inputs from primary electromagnets 150*a* and 150*b*. Each input may control separate devices. For example, electromagnet 150*a* may be located near the door handle of the driver's side door or other convenient location for locking/unlocking it and electromagnet 150*b* may be situated behind the steering column or other accessible location in the interior of the vehicle to activate the ignition and/or supply electrical power. Additional electromagnets may be provided to operate an alarm system, trunk lock, kill switch, or other function.

Each electromagnet, as previously described, is associated with a coil relay 175, a sensor 170, and an AND GATE 610. The sensor, upon detecting an object in its field, switches on the corresponding coil relay to allow AC current from the AC-DC converter to flow through the appropriate primary electromagnet to form an electromagnetic field, thus operating the activator. The output of the sensors may be connected to the input of an OR GATE 730. The output of the OR GATE controls a power switch 740, which regulates DC power to the controller. In this manner, the battery is conserved since power is supplied to the controller only when needed.

c. Data Transmission

Figure 8:
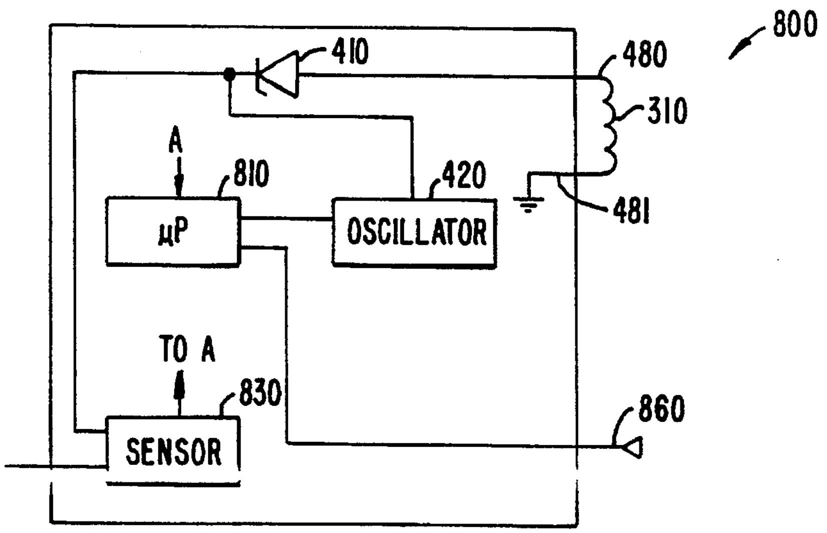
FIG. 8 illustrates an activator that transmits data.

FIG. 8 illustrates a passive data transmission unit which collects and transmits data. The data transmission unit may be adapted for use as a surgically implanted device. The use of a passive data transmission unit eliminates the need for surgically removing the device to replace the battery or requiring external electrical connections or receptacles to power the implanted device. Furthermore, the present invention is capable of extreme miniaturization, which may be necessary in certain applications.

Data transmission unit 800 is connected to a coil 310. When the coil is placed in the electromagnetic field generated by a controller, AC voltage is induced. When the voltage in the coil reaches the minimum operating level, the data transmission unit is switched on. This voltage may be, for example, about 3 volts or less. End 480 of coil 310 provides an input to diode 410, which in some embodiments is a Zener diode while end 481 is connected to ground. The diode converts the AC voltage to DC pulses for operating the transmission unit.

The data transmission unit comprises a microprocessor 810, oscillator 420, and sensor 830. The microprocessor may be a microprocessor of the type that is well known to those skilled in the art. Microprocessor 810 includes appropriate ROM and/or NVRAM memory for storing the computer program and data. Oscillator 420 controls the speed at which the microprocessor executes instructions.

The sensor, for example, may be any biosensor, chemical sensor, thermal sensor, fluid sensor, voltage sensor, or other detector. Depending on the application, sensor 830 may generate an analog signal. For such application, an analog to digital converter (not shown) may be provided to convert the analog signal to digital data. The microprocessor retrieves the data and formats it for transmission via an antenna 860. The data may be formatted using various modulation techniques, such as those described herein.

In some instances, it may not be possible to transmit all of the data within one DC pulse. This problem may be resolved by programming the microprocessor to store data in memory so as to allow the data to be transmitted in segments during subsequent pulses. Flash memory, NVRAMs, or other static memory may be employed so that data would not be lost when voltage falls below the minimum operating level.

The data is then received by the controller, which may be similar to the controller described in FIGS. 1*a*–1*b*. The controller may be appropriately programmed to receive and process the data. The controller may be interfaced with an appropriately programmed computer for downloading and processing of the data.

d. Increased Capacity

Figure 9:
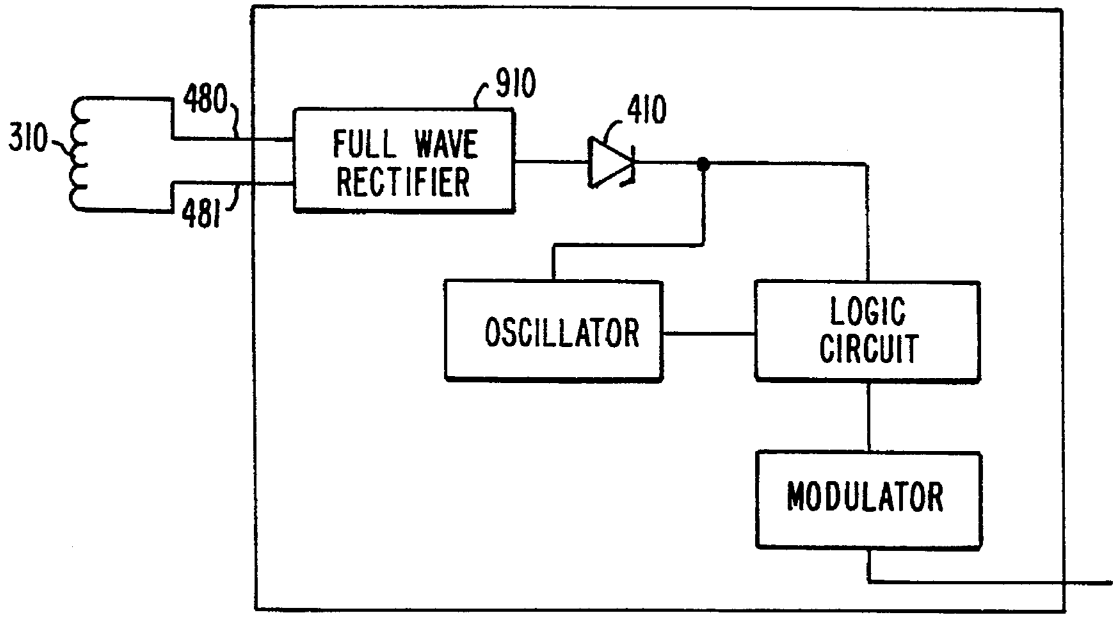
FIG. 9 illustrates an activator with increased capacity.

FIG. 9 illustrates an alternative embodiment of the passive activator. As shown, the activator includes a coil 310 for generating AC voltage when placed in an electromagnetic field. The coil ends 480 and 481 are connected to a full wave rectifier 910, which doubles the number of DC pulses generated within the same time period. For example, if the primary electromagnetic field is 60 Hz, then the number of DC pulses generated in one second is about 120. As a consequence, twice as much data or code may be transmitted per unit time as compared to activators without the full wave rectifier.

A diode 410, such as a Zener diode, restricts the DC pulses to a maximum voltage level. The output of diode serves to power the activator's electronic components.

e. Provisioning of both Positive and Negative Voltage

Figure 10:
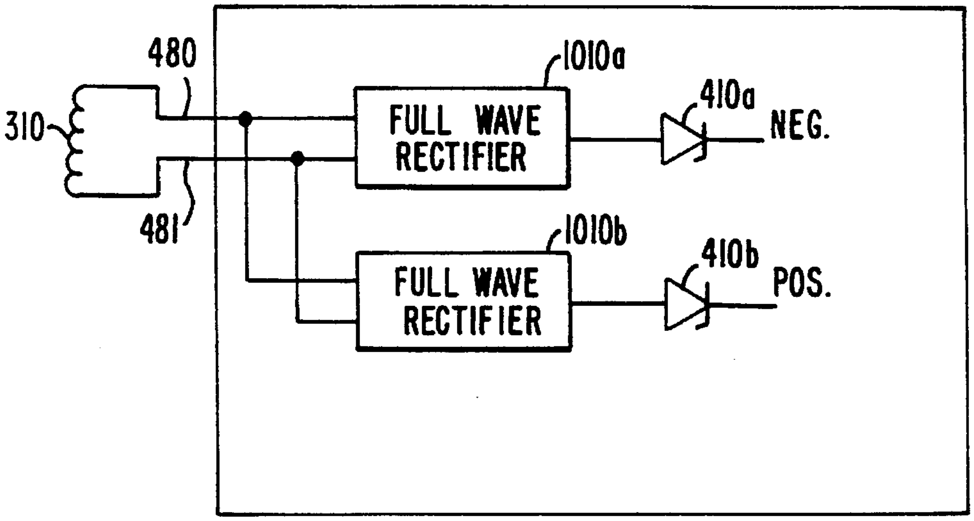
FIG. 10 illustrates an activator capable of generating both positive and negative voltages.

FIG. 10 illustrates an alternative embodiment of the passive activator system which provides both positive and negative DC voltages. The activator includes a coil 310 for generating AC voltage when placed in an electromagnetic field. The coil ends 480 and 481 are connected to full wave rectifiers 1010*a* and 1010*b*. According to one embodiment, rectifiers 1010*a* and 1010*b* are configured to generate positive and negative DC pulses respectively.

A diode 410*a*, such as a Zener diode, restricts the DC pulses generated by rectifier 1010*a* to a maximum positive voltage level. Similarly, a diode 410*b* restricts the DC pulses from rectifier 1010*b* to a maximum negative voltage level. In this manner, the desired positive and negative voltages may be produced from the induced AC voltage. These voltages are used to operate the activator. The availability of complementary voltages enables the activator to employ analog circuits or other circuits requiring both positive and negative voltages. As a result, the activator may be used to both receive and transmit signals.

f. Key Code Encryption

Figure 11A:
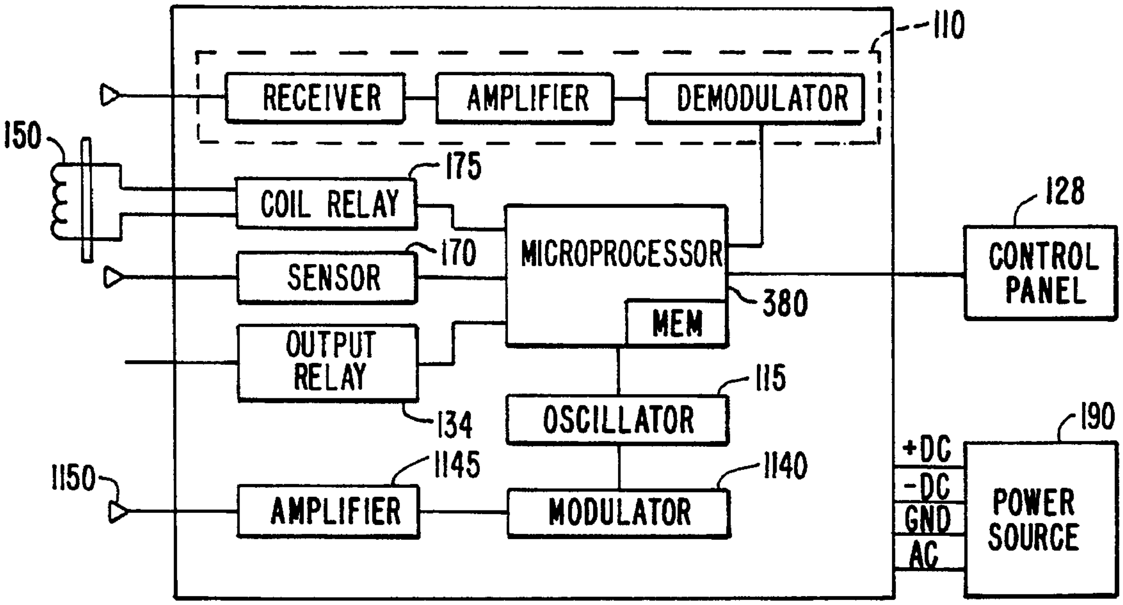
FIGS. 11*a*–11*b* illustrate an identification system which encrypts the key code for added security.
Figure 11B:
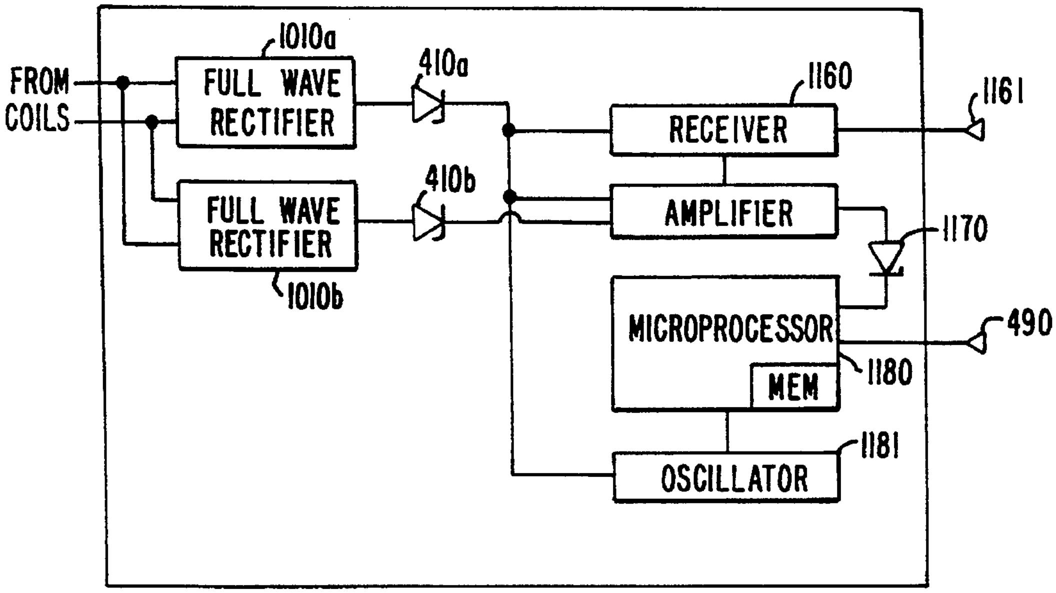

FIGS. 11*a*–11*b* illustrate identification system that encrypts the key code for security purposes. The controller, as shown in FIG. 11*a*, includes a primary electromagnet 150, a sensor 170, a coil relay 175, a power source 190, microprocessor 380, control panel 128, signal processor 110, oscillator 115, and output relay 134, such as those already described. When the activator is placed in the vicinity of the electromagnet, sensor 170 sends a signal to the microprocessor. In response, the microprocessor switches on coil relay 175, thus forming an electromagnetic field between the poles of the magnet.

Simultaneously, the microprocessor generates a random number from a random number generation program which is stored in memory. The random number, after being written into memory, is broadcasted by a modulator 1140 and an amplifier 1145 via an antenna 1150. In one embodiment, the modulator encodes the random number on a carrier wave derived from the oscillator's output. Other modulation techniques, such as those described herein, may also be used.

The activator receives the random number, encrypts the key code, and transmits it to the controller. Details of the activator will be discussed in connection with FIG. 11*b*.

The controller's signal processor receives and demodulates the signal to obtain the encrypted key code. The microprocessor then decodes the encrypted key code using the same random number (stored in memory) and compares it with authorized key codes.

Referring to FIG. 11*b*, the passive activator employs full wave rectifiers 1010*a* and 1010*b* and diode 410*a* and 410*b* to provide both positive and negative DC voltages. An amplifier 1165 may necessitate the provision of negative voltage. In operation, a receiver 1160 receives the signal containing the random number via an antenna 1161. Amplifier 1165 boosts the signal to a readable voltage level (i.e., 5 volts) for processing. The amplified signal passes through a diode 1170, such as a Zener diode, and into a microprocessor 1180 operating at a frequency dictated by an oscillator 1181. Diode 1170 limits the voltage of the amplified signal to prevent damaging the microprocessor.

The microprocessor includes a memory such as ROM or other non-volatile memory. The memory contains an encryption program and a key code, which are programmed at the factory. The microprocessor receives the random number and encrypts the key code with it. Various encryption schemes may be employed, including those disclosed in Denning, *Cryptography and Data Security*, Addison-Wesley Publishing Company, 1982 incorporated herein by reference for all purposes. In one embodiment, the system employs a multi-level encryption technique wherein the first three bits of the transmission code may represent or identify the specific encryption program used to encrypt the key code. The controller, upon receipt of this digit, retrieves the appropriate decipher program from memory to use. Each subsequent decipher program version can be designed to accept prior versions so that older activator models can still operate a newer version controller.

The resulting encrypted key code is then broadcasted by the microprocessor via an antenna 490. By encrypting the code with a random number, the signal is virtually never the same and thus of no use to anyone attempting to intercept, record, and steal the key code.

The present inventions provide an identification system having a passive activator for transmitting an identification code. It is to be understood that the above description is intended to be illustrative and not restrictive. Many embodiments will be apparent to those skilled in the art upon reviewing the above description. Merely as an example, the activator may be formed in many convenient shapes, such as a watch, bracelet, wrist or arm band, or any other device which can be worn or carried on extremities of the body.

The present invention may also be implemented in conjunction with other systems, such as a manual key. For example, an activator may be implemented with a manual key system to activate a switch such as an automobile ignition or other device. The activator may be implemented either in parallel or in serial with the manual key system. In a serial application, the activator must first enable the switch before the manual key may be employed. On the other hand, either a manual key or an activator may enable the switch if the system is employed in a parallel mode. This parallel feature would permit one user to give a manual key to another user to operate the vehicle when desired. The system's control panel would have an additional feature to switch from parallel to serial operation or from serial to parallel operation depending on the desired usage and security. This multi-mode operation feature will find a wide range of applications, for example, mail boxes, doors, automobile doors and trunk, and other security systems.

The activator may also be used in combination with other security systems such as, but not limited to, audio systems using tones or voices or with optical systems using light transmissions or scanners. Such combinations may increase overall convenience and security.

Additionally, the present invention can be used as a maximum personal security identification system. For example, the activator may be incorporated as an implanted device utilizing sophisticated encryption techniques. This prevents the device from being lost or stolen. Moreover, encrypting the key code renders recording or copying the key code transmission virtually useless. Other uses include converting the key code transmission such that it is compatible for transmission over long distance via telephone, radio wave transmission, or computer networks. The system may also be used as a verification system for remote access of safeguarded information or devices.

The scope of the invention should, therefore, be determined not with reference to the above description but, instead, should be determined with reference to the appended claims along with their full scope of equivalents.

What is claimed is:

1. An apparatus for encoding and decoding signals, said apparatus comprising:

a controller comprising an electromagnet for generating an electromagnetic field; and a passive activator comprising:

i) a secondary coil for producing an alternating current signal therein when placed in said electromagnetic field, ii) a rectifier connected to said secondary coil for converting said alternating current signal to a plurality of direct current pulses, each of said plurality of direct current pulses corresponding to a peak segment of said alternating current signal, and iii) a transmitter being powered by said plurality of direct current pulses, said transmitter transmitting a signal comprising a code, said transmitter being inactive outside the duration of said direct current pulses.

2. The apparatus as recited in claim 1 wherein said electromagnet comprises a primary coil wound around a U shaped core and generates said electromagnetic field at a frequency that is less than 10 kHz.

3. The apparatus as recited in claim 1 wherein said controller comprises:

a signal processor for receiving and processing said signal to obtain said code;

a code processor coupled to said signal processor for comparing said code with an authorization code; and an oscillator coupled to said code processor for providing a clocking signal for operating said code processor.

4. The apparatus as recited in claim 3 wherein said signal processor comprises:

a receiver coupled to an antenna, said receiver tuned to receive said signal;

an amplifier circuit coupled to said receiver for amplifying said signal to a readable voltage level;

a demodulator coupled to said amplifier for separating said code from said signal.

5. The apparatus as recited in claim 3 wherein said code processor comprises:

a memory for storing operating instructions and said authorization code;

a microprocessor being in communication with said memory, said microprocessor accessing said memory to fetch said operating instructions and authorization code therefrom for comparing said code with said authorization code according to said operating instructions and generating an output when said code matches said authorization code.

6. The apparatus as recited in claim 5 wherein said code processor stores a plurality of said authorization codes in said memory, said code processor generating an output when said code matches one of said plurality of authorization codes.

7. The apparatus as recited in claim 1 wherein said rectifier comprises a Zener diode for limiting said plurality of direct current pulses to a predetermined voltage level.

8. The apparatus as recited in claim 1 wherein said passive activator further comprises an oscillator, said oscillator having a frequency sufficient for transmitting said code within one of said plurality of direct current pulses, said oscillator being powered by said plurality of direct current pulses.

9. The apparatus as recited in claim 8 wherein said transmitter comprises:

a counter circuit coupled to said oscillator;

a shift register circuit connected to said counter circuit for storing said code and shifting said code so that said code is transmitted serially during one or more of said pulses, said shift register being controlled by said divider circuit; and a modulator circuit coupled to said shift register for encoding and transmitting said code, said modulator circuit coupled to said oscillator such that said carrier wave is generated by said oscillator.

10. The apparatus as recited in claim 1 wherein said activator is encased in a ring band.

11. The apparatus as recited in claim 1 wherein said activator further comprises a full wave rectifier coupled to said secondary coil, said full wave rectifier for generating said direct current pulses at a frequency that is twice the frequency of said alternating current signal.

12. The apparatus as recited in claim 1 wherein said activator further comprises;

a first full wave rectifier coupled to said secondary coil, said first full wave rectifier providing a plurality positive voltage direct current pulses;

a first rectifier coupled to said first full wave rectifier for restricting said plurality of positive voltage direct current pulses to a predetermined voltage level to prevent damaging said activator, said first rectifier comprising a Zener diode;

a second full wave rectifier connected to said secondary coil, said second full wave rectifier providing a plurality of negative voltage direct current pulses; and a second rectifier coupled to said second full wave rectifier for restricting said plurality of negative voltage direct current pulses to a predetermined voltage level to prevent damaging said activator, said second rectifier comprising a Zener diode.

13. The apparatus as recited in claim 12 further comprising:

a receiver for receiving a transmission from said controller; and an amplifier coupled to said receiver for boosting said transmission to a readable voltage level, said amplifier being powered by said plurality of positive direct current pulses and said plurality of negative direct current pulses.

14. The apparatus as recited in claim 1 wherein said transmitter comprises:

a microprocessor; and a memory coupled to said microprocessor for storing said code and operating instructions, said operating instructions used by said microprocessor for transmitting said code during one or more of said DC pulses.

15. The apparatus as recited in claim 1 wherein said electromagnet comprises a primary coil wound around a C shaped core and generates said electromagnetic field at a frequency that is less than 10 kHz.

16. The apparatus as recited in claim 1 wherein said controller further comprises an encryption circuit for transmitting an encryption code.

17. The apparatus as recited in claim 16 wherein said passive activator further comprises:

a receiver for receiving data transmitted from said controller, said data comprising an encryption code;

an amplifier circuit coupled to said receiver for amplifying said encryption code to a readable voltage level;

a rectifier coupled to said amplifier and said microprocessor for limiting the amplified encryption code from said amplifier to a predetermined voltage level into said microprocessor, said microprocessor encrypting said code with said encryption code according to an encryption program stored in said memory to form an encrypted code and transmitting said encrypted code to said controller.

18. A passive activator said passive activator comprising:

a secondary coil for producing an alternating current signal therein when placed in an alternating current electromagnetic field, a rectifier connected to said secondary coil for converting said alternating current voltage to a plurality of direct current pulses, each of said plurality of direct current pulses corresponding to a peak segment of said alternating current signal, and an electronic circuit powered by said plurality of direct current pulses, wherein said electronic circuit is inactive outside the duration of said direct current pulses.

19. The passive activator as recited in claim 18 wherein said electronic circuit comprises a processor, said processor being inactive outside the duration of said pulses.

20. The passive activator as recited in claim 18 wherein said rectifier comprises a Zener diode for limiting said plurality of direct current pulses to a predetermined voltage level.

21. The passive activator as recited in claim 18 wherein said electronic circuit comprises a transmitter for transmitting a signal comprising a code, said transmitter being inactive outside the duration of said pulses.

22. The passive activator as recited in claim 21 wherein said code is transmitted serially during a single pulse.

23. The passive activator as recited in claim 21 wherein said passive activator comprises an oscillator, said oscillator having a frequency sufficient for transmitting said code within one of said plurality of direct current pulses, said oscillator being powered by said plurality of direct current pulses.

24. The passive activator as recited in claim 21 wherein said transmitter comprises:

a counter circuit coupled to said oscillator;

a shift register circuit connected to said counter circuit for storing said code and shifting said code so that said code is transmitted serially during one or more of said pulses, said shift register being controlled by said divider circuit; and a modulator circuit coupled to said shift register for encoding and transmitting said code, said modulator circuit coupled to said oscillator such that said carrier wave is generated by said oscillator.

25. The passive activator as recited in claim 23 wherein said transmitter and said oscillator turn on when said direct current pulses exceed a voltage V1 and turn off when said direct current pulses drop below V1.

26. The passive activator as recited in claim 18 wherein said activator is encased in a watch.

27. The passive activator as recited in claim 18 wherein said activator is encased in a bracelet band.

28. The passive activator as recited in claim 18 wherein said activator is implemented as a custom integrated circuit.

29. The passive activator as recited in claim 18 wherein said activator is encased in a ring band.

* * * * *